UNITED STATES PATENT OFFICE.

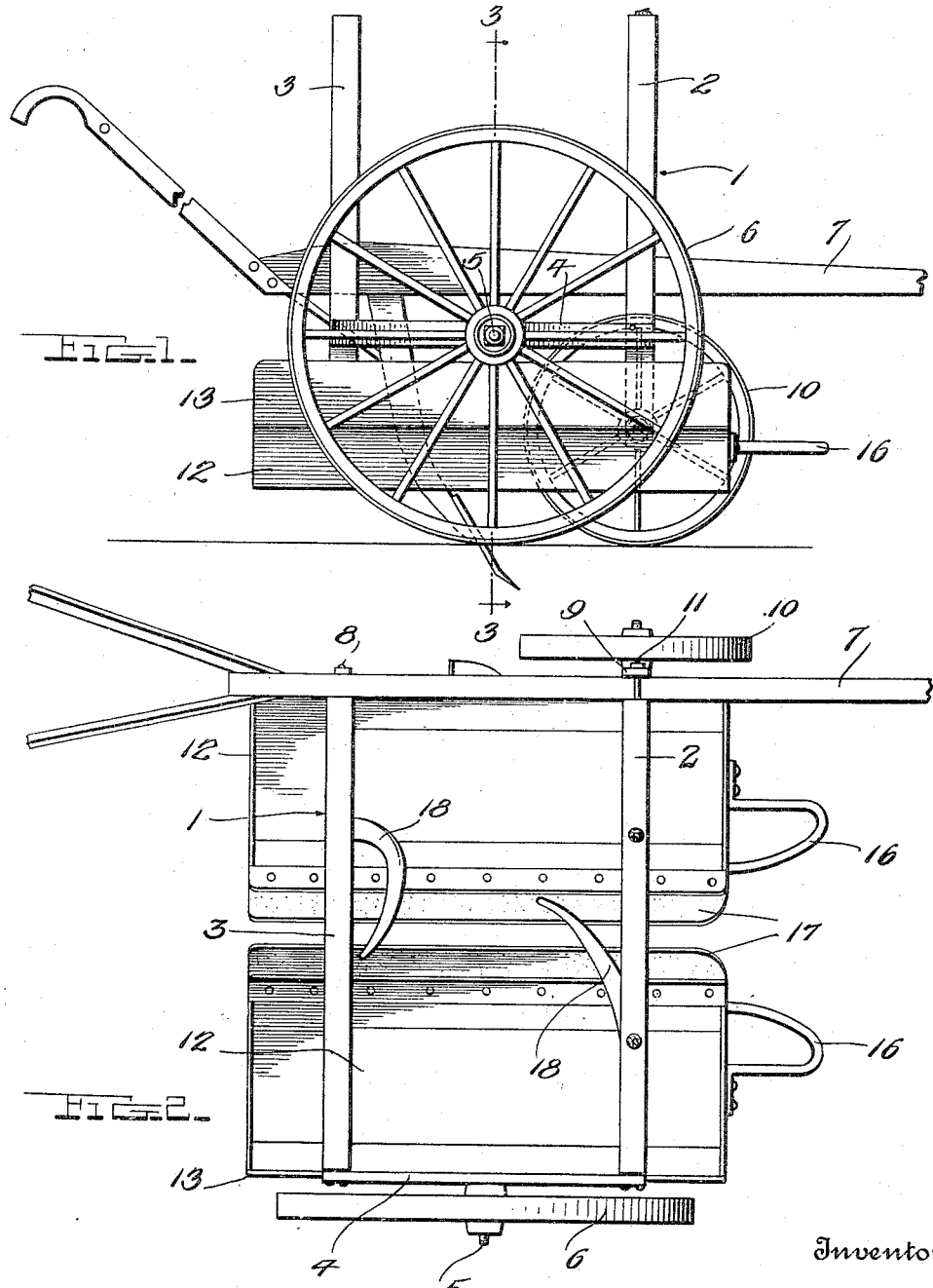

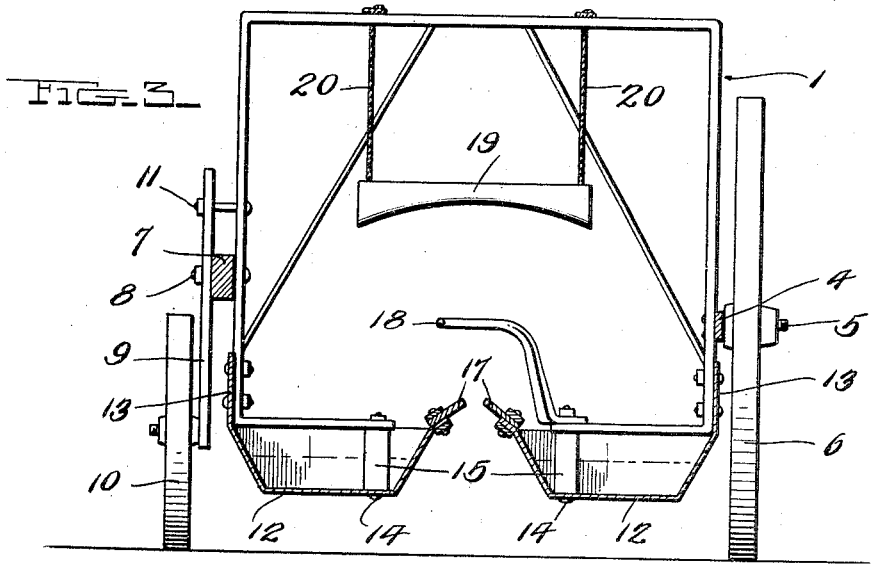

GEORGE W. STUART, OF BAY MINETTE, ALABAMA.

INSECT-EXTERMINATOR.

1,206,612.   Specification of Letters Patent.   Patented Nov. 28, 1916.

Application filed September 11, 1916. Serial No. 119,484.

*To all whom it may concern:*

Be it known that I, GEORGE W. STUART, a citizen of the United States, residing at Bay Minette, in the county of Baldwin and State of Alabama, have invented certain new and useful Improvements in Insect-Exterminators; and I do declare the following to be a full, clear, and exact description of the invention, such as will enable others skilled in the art to which it appertains to make and use the same.

My invention aims to provide a simply constructed and inexpensive yet highly efficient and durable machine for removing boll weevil from cotton plants, potato bugs from potato vines, and other insects from numerous other kinds of growing crops.

With the foregoing general object in view, the invention resides in certain novel features of construction and in unique combinations of parts to be hereinafter fully described and claimed, the descriptive matter being supplemented by the accompanying drawings which constitute a part of this specification, and in which:

Figure 1 is a side elevation of the improved machine applied to a cultivator so as to remove the insects at the same time the crops are worked; Fig. 2 is a top plan view; Fig. 3 is a vertical transverse section on the plane of the line 3—3 of Fig. 1; and Fig. 4 is a perspective view of the frame.

In the drawings the numeral 1 designates broadly the frame of the improved machine, said frame including front and rear arches 2 and 3 each formed of a single metal bar with its lower ends bent horizontally toward each other as shown clearly in Figs. 3 and 4. The vertical sides or legs of the arches 2 and 3 at one side of the machine are connected by a horizontal longitudinal bar 4 from which a stub shaft 5 projects laterally, said shaft carrying a comparatively large wheel 6. The legs of the arches 2 and 3 at the opposite sides of the machine contact with the inner side of a cultivator beam 7 and are secured thereto by bolts 8, the front bolt also assisting in securing a vertical bar 9 in place, said bar rising rigidly from the axle of a small wheel 10 located beneath the beam 7. Another bolt 11 preferably co-operates with the bolt 8 for securing the bar 9 in place, and it will be obvious that this bar and the adjacent leg of the arch 2 form an effective clamp for attaching the machine to the cultivator.

A pair of elongated rectangular pans 12 are disposed beneath the inturned ends of the arches 2 and 3 and are provided along their outer edges with upstanding flanges 13 bolted to the lower ends of the legs of said arches, the bottoms of the pans being secured to the extremities of the inwardly directed ends of said arches by bolts or the like 14 which pass through these parts and through spacers 15 interposed between them.

Suitable guides 16 are disposed on the inner corners of the pans 12 at the front ends thereof to facilitate the passage of the plants between the pans, and to prevent the edges of said pans from injuring the plants, they are preferably provided with soft rubber strips 17. Oppositely directed arms 18 extend obliquely from each pan toward the other above the strips 17 as shown, and serve to force the tops of the plants alternately in opposite directions to jar the insects therefrom into the pans which will contain kerosene or other liquid which will kill the trapped insects. A beating bar 19 is suspended by means of wires, cables or the like 20 from the crown of the arch 2 and said bar is adapted to strike the tops of the plants to dislodge any bugs therein, whereupon they will be deposited into the pans when the plants are shaken from side to side by the arms 18.

From the foregoing it will be obvious that although the machine is extremely simple and inexpensive it will be highly efficient and durable and for these reasons the construction shown and described constitutes the preferred form of the machine. It is to be understood, however, that within the scope of the invention as claimed numerous minor details may be changed without sacrificing the principal advantages.

I claim:

An insect exterminator comprising a frame including a front and a rear arch each formed of a single metal bar with its lower ends bent inwardly toward each other and spaced apart, and a longitudinal bar secured rigidly at its ends to the legs of the arches at one side of the machine, the legs at the other side thereof being adapted to be secured to a cultivator beam, a vertical bar spaced outwardly from one of the last named legs, means for drawing said vertical bar toward said one leg to clamp the cultivator beam between the two, a wheel mounted on the lower end of said vertical bar, a second wheel mounted on the aforesaid longitudinal bar, and a pair of parallel elongated pans beneath the aforesaid inwardly bent ends of the arches, said pans having upstanding flanges along their outer edges secured to the legs of the arches, the bottoms of said pans being secured to the inner terminals of said inwardly bent ends.

In testimony whereof I have hereunto set my hand.

GEORGE W. STUART.

Copies of this patent may be obtained for five cents each, by addressing the "Commissioner of Patents, Washington, D. C."